INVENTOR
BURTON A. JONES
BY Jack N. M. Cartley
AGENT

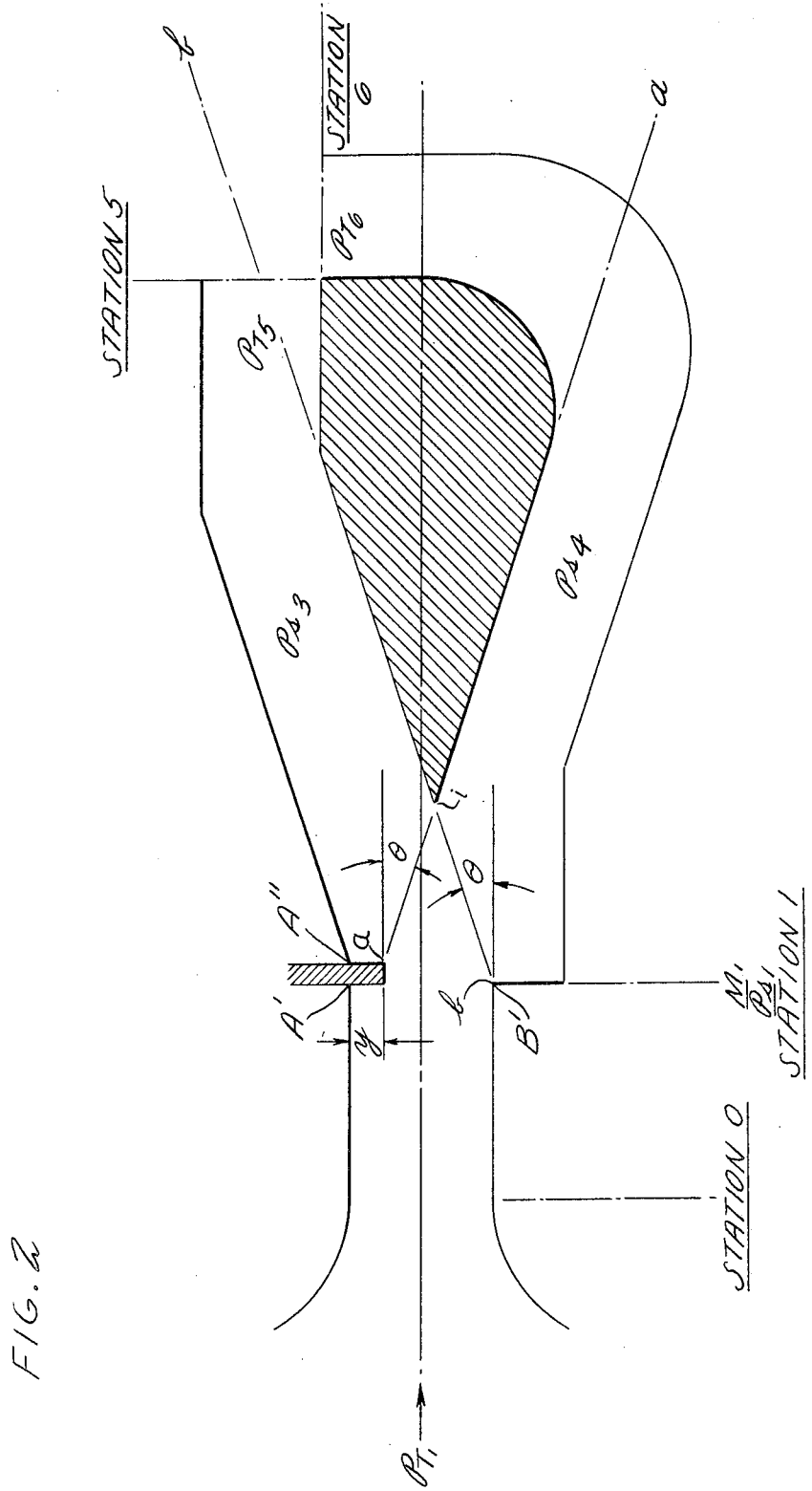

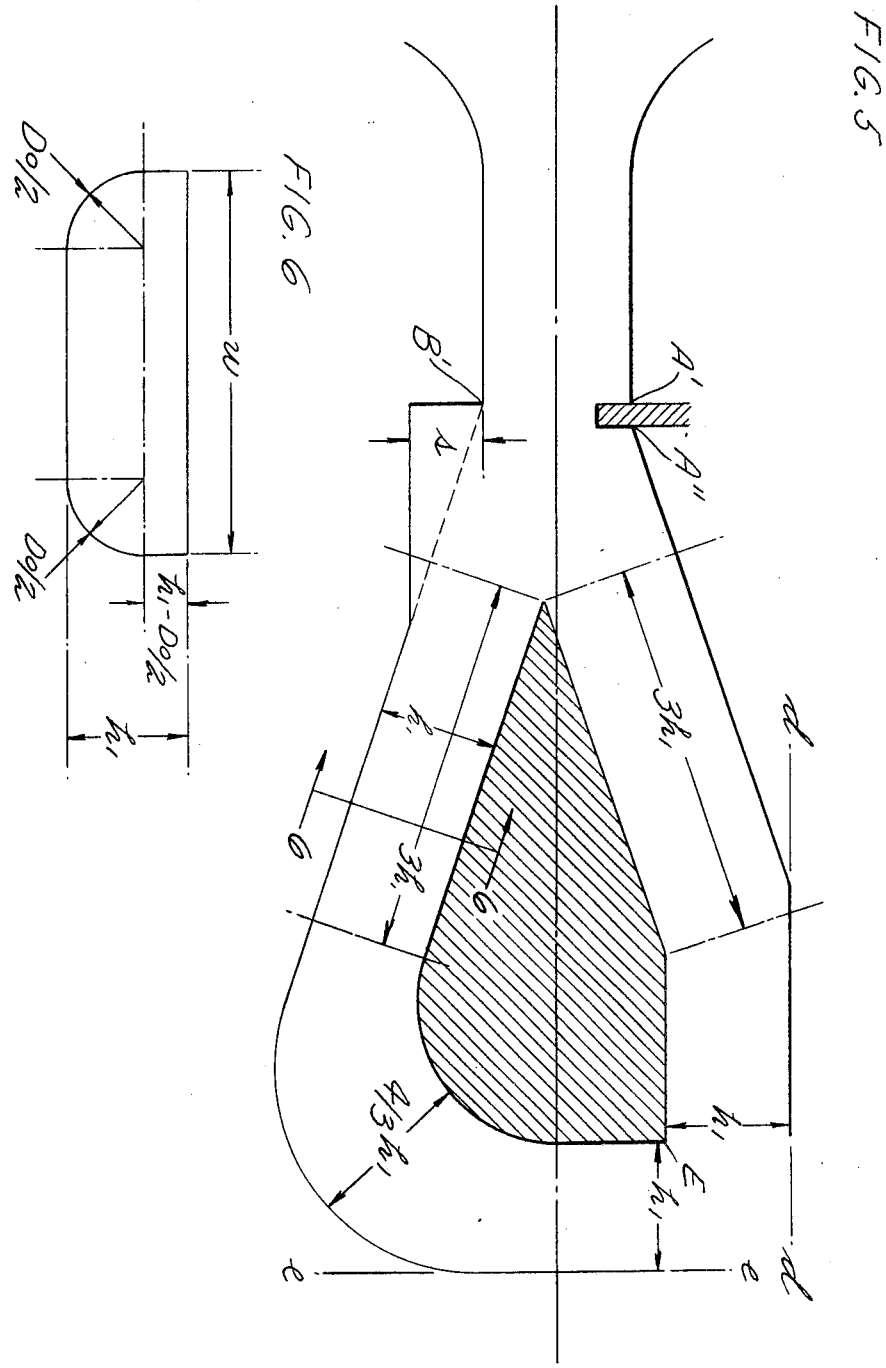

United States Patent Office 3,508,579
Patented Apr. 28, 1970

1

3,508,579
AERODYNAMIC MONOSTABLE VALVE
Burton A. Jones, North Palm Beach, Fla., assignor to United Aircraft Corporation, East Hartford, Conn., a corporation of Delaware
Filed Dec. 29, 1965, Ser. No. 517,490
Int. Cl. F15c 3/00
U.S. Cl. 137—610        21 Claims

ABSTRACT OF THE DISCLOSURE

An aerodynamic gas valve having a first conduit means with an outlet conduit means connected thereto having two outlet passages. A means being provided to direct flow from the first conduit means for distribution between the two passages of said outlet conduit means. Said directing means including a tab movable into and out of the flow from said first conduit means. A setback portion is located at a point opposite from said tab. The leading edge of the divider formed between the two outlet passages is located between the center line of the first conduit means and the edge of said conduit means adjacent said setback portion. The first conduit means is formed having a divergent section with the throat having a circular cross section and the exit of the first conduit means being formed as an oval having parallel sides.

The present invention relates to a type of aerodynamic gas valve which is monostable.

This invention has as its basis the pure fluid amplifier concept, described in Warren Patent No. 3,001,698 and also incorporates the feature of Patent No. 3,135,291 which extends the operating range of fluid amplifiers to extremely low ambient pressure environment.

Whereas the subject invention incorporates certain features that are in part ascribed to the above patents, the subject invention combines these and its own particular features to provide a gas flow direction control device that represents an advance in the art, as will be made clear in the description. Although the subject invention can be used in a variety of ways wherein it is desired to control the direction of a gas, it is particularly useful in rocket steering application, either for secondary injection thrust vector control or as an attitude control device.

An object of this invention is to provide an aerodynamic gas valve providing for automatic flow in a preselected passage, hence, monostable, with controlled deflection by a tab.

Another object of this invention is to provide an aerodynamic gas valve with the ability to control the exhaust vector angle at any angle within an included angle of approximately 90° from the plane of the exhaust by means of controlled actuation of the tab.

A further object of this invention is to provide a gas valve wherein gas flow returns to the original direction when the control mechanism is deactivated.

Another object of this invention is to provide an aerodynamic gas valve having a primary nozzle section, primary diffuser section, and two passage sections wherein flow is maintained from the primary nozzle section to one passage section at all times until a tab is used to divert and hold flow to a second passage section.

A further object of this invention is to provide an aerodynamic gas valve wherein the flow divider is specifically positioned to locate its forward end with relation to an actuated tab to properly proportion the length of the passage sections and areas thereof.

Another object of this invention is to provide a variable position deflector for controlling the flow between the stable passage and other outlet passages.

2

A further object of this invention is to provide a monostable valve having the capability of providing a modulated side force for thrust vector control while maintaining a basic principle of the aerodynamic valve.

Another object of this invention is to provide means for deflecting flow from the inlet which will vary the flow from automatic stability in one passage to full flow into the other passage and back.

A further object of this invention is to provide a modulating aerodynamic valve having monostability.

Another object of this invention is to provide a monostable valve with a conduit defining a flow path which enters into a second conduit having an inlet with two flow paths extending therefrom, a tab being located where said conduits are connected for movement into and out of the conduit, the movement of said tab controlling the flow from said first conduit into one or the other of the two flow paths of said second conduit.

Other objects and advantages will be seen from the following detailed specification and drawings.

FIGURE 2 is a view similar to FIGURE 1 wherein pressure locations are noted along with station positions.

FIGURE 5 is a view similar to FIGURE 1 wherein the dimensions of the passage sections are set forth.

FIGURE 6 is a view taken along the line 6—6 of FIGURE 5 showing the cross-sectional view of the passage 4.

Figure 1:
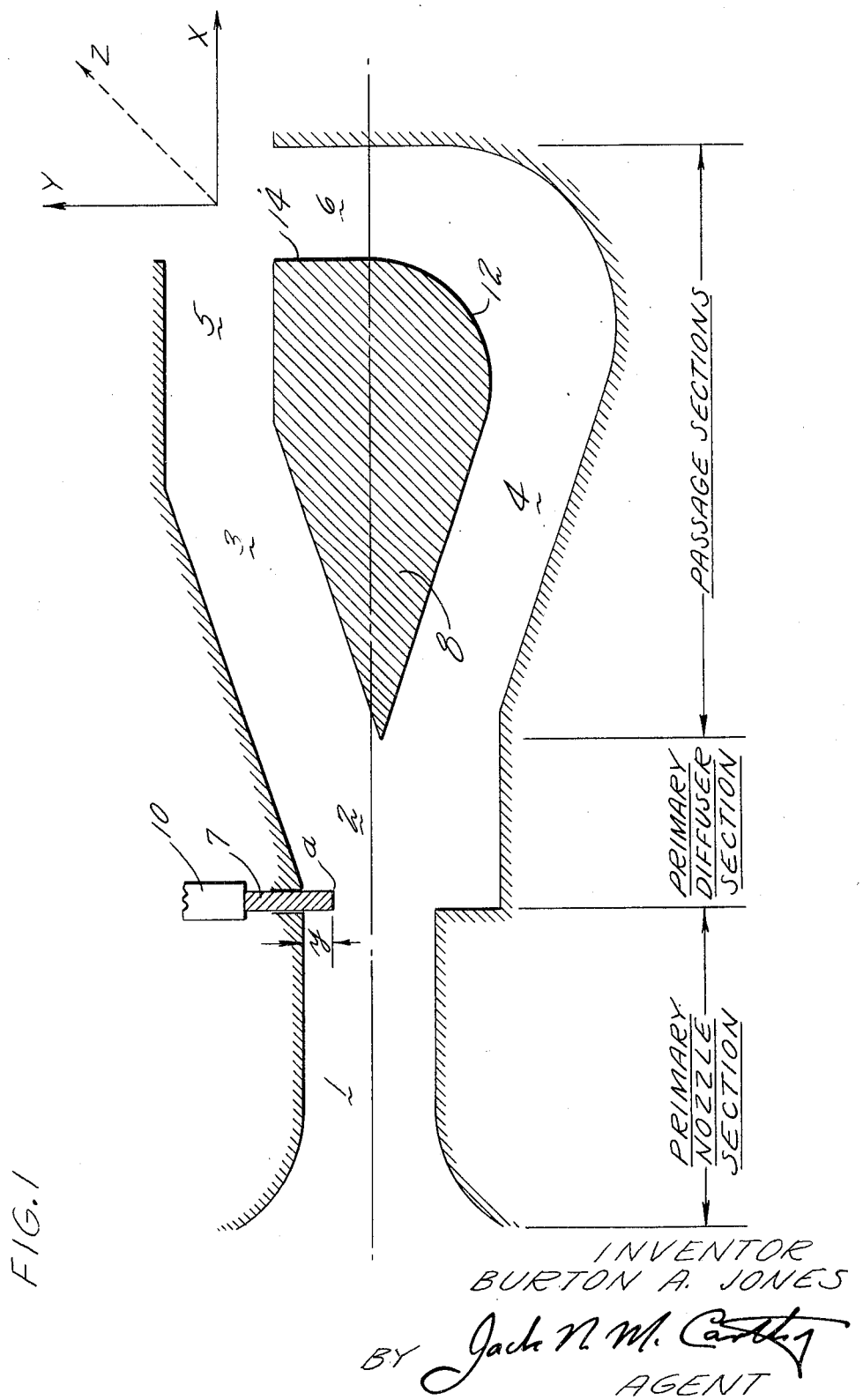
FIGURE 1 is a diagrammatic view of an aerodynamic valve showing the tab in its extended position.

FIGURE 1 is a diagrammatic sketch of an aerodynamic valve having a primary nozzle section 1, a primary diffuser section 2, an axial diffuser passage section 3, a lateral diffuser passage section 4, an exhaust section 5 for passage 3 and an exhaust section 6 for passage 4. Bistable devices exist in the prior art wherein momentary actuation of a first tab or control pulse switches flow from one of the passage sections to the other where it would be locked in place. In these devices a second tab or control pulse is required, located opposite from the first tab or control pulse to return the flow to the other passage. In the subject invention the flow is directed to passage 4 and will remain in passage 4 only as long as a tab 7, located at the exit of the primary nozzle section, is activated and the flow returns to passage section 3 automatically when the tab 7 is deactivated with the further capability of stable intermediate flow splits between passage sections 3 and 4 at intermediate tab positions. An actuator 10 positions the tab 7. This actuator can be manually operated or automatically operated by a control system responsive to, for example, vehicle stability or direction.

The present invention operates in the following manner. Gas enters the primary nozzle from left to right in FIGURE 1. If the tab 7 is fully retracted (deactivated) the flow follows passage section 3 and is passed through exhaust section 5 in direction X. If the tab 7 is fully immersed (activated) to position y shown in FIGURE 1, the flow follows passage section 4 and passes through exhaust section 6 in direction Y. For intermediate positions of the tab 7 (partially activated) the flow is divided between passage sections 3 and 4 passing through exhaust sections 5 and 6, respectively, and exhausting at some intermediate angle between X and Y, giving an exhaust a direction such as Z, the angle depending on the position of the tab 7. To construct an aerodynamic gas valve as shown in FIGURE 1, the following information is required:

(1) $Ps_3$—the static pressure in passage section 3 when passage section 4 is flowing full;
(2) $Ps_4$—the static pressure in passage section 4 when passage section 3 is flowing full;
(3) $PT_1$—total pressure at inlet;
(4) $PT_5$—total pressure at the exit of exhaust section 5;
(5) $PT_6$—total pressure at the exit of exhaust section 6;
(6) $M_1$—Mach number at the exit of the primary nozzle 1;
(7) $Ps_1$—the static pressure at the exit of the primary nozzle 1;
(8) y—maximum tab emersion;
(9) Location of line aa; and
(10) Location of line bb;

$Ps_3$ can be found with sufficient accuracy from the assumptions that (1) $$PT_6 = 0.50 PT_1$$

and (2) $$Ps_3/PT_6 = \left[1 + \frac{\gamma-1}{2} M_1^2\right]^{\frac{\gamma}{\gamma-1}}$$

where $\gamma$ is the ratio of specific heats of the gas. $Ps_4$ can be found with sufficient accuracy from the assumptions that $$PT_5$$

and (4) $$Ps_4/PT_5 = \left[1 + \frac{\gamma-1}{2} M_1^2\right]^{\frac{\gamma}{\gamma-1}}$$

where $\gamma$ is the ratio of the specific heats of the gas.

The value of $PT_5$ or $PT_6$ depends on the Mach number, $M_1$. As $M_1$ increases, the total pressure at these points decreases. It is desirable to keep the total pressure as large as possible while at the same time accomplish the other objectives of the invention.

Figure 3A:
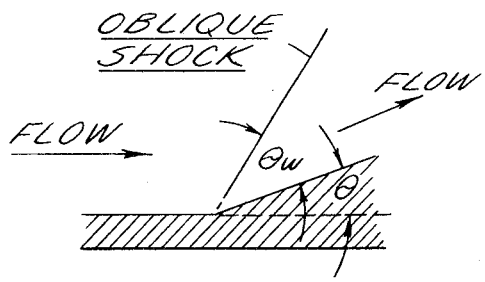
FIGURE 3A is a figure showing the formation of an oblique shock wave in a passageway where the wall changes direction.
Figure 3B:
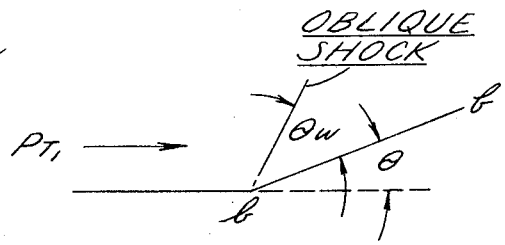
FIGURE 3B is a view showing the formation of an oblique shock at point b of FIGURE 2.
Figure 3C:
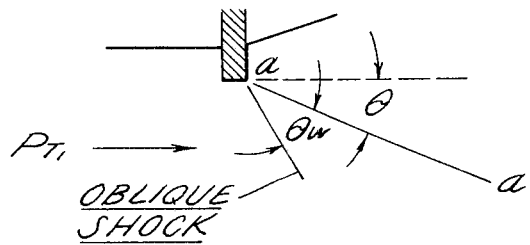
FIGURE 3C is a view showing the formation of an oblique shock at point a of FIGURE 1.

Lines aa and bb result from consideration of plain oblique shock theory (see FIG. 3A). The angle $\theta$ is the angle that the flow must be turned to all be in passage section 3 or all be in passage section 4. The flow is turned through this angle by means of an oblique shock that results from pressure conditions $Ps_3$ or $Ps_4$ and $Ps_1$, according to the following standard equations:

(5) $$\frac{Ps_3}{Ps_1} = \frac{2\gamma}{\gamma-1} M_1^2 - \frac{\gamma-1}{\gamma+1}$$

and (6) $$\text{Tan}(\theta w - \theta) = \frac{\frac{2}{\gamma-1} + \frac{\gamma-1}{\gamma+1} M_1^2 \sin \theta_w}{M_1^2 \sin \theta_w \cos \theta_w}$$

where $\theta_w$ is the oblique shock angle as shown in FIGURES 3B and 3C, and $Ps_1$ is calculated from the following equation:

(7) $$\frac{Ps_1}{PT_1} = \left[1 + \frac{\gamma-1}{2} M_1^2\right]^{\frac{\gamma}{\gamma-1}}$$

$M_1$ must be selected such that all of the above conditions are satisfied, including the interdependence between $Ps_3$, $PT_5$ and $M_1$ and between $Ps_4$, $PT_6$ and $M_1$. There is only one value of $M_1$ that satisfies all of these conditions. That value is approximately 2.0, (iterative calculations with known values of $PT_5$ and $PT_6$ with $\gamma=1.2$ have shown $M_1=1.97$.

The following considerations are necessary in generating the internal passages for this aerodynamic gas valve. Since the gas flow quantity, inlet pressure $PT_1$, temperature, and composition of the gas are specified, the diameter, $D_0$, can be calculated from standard flow equations.

Figure 4A:
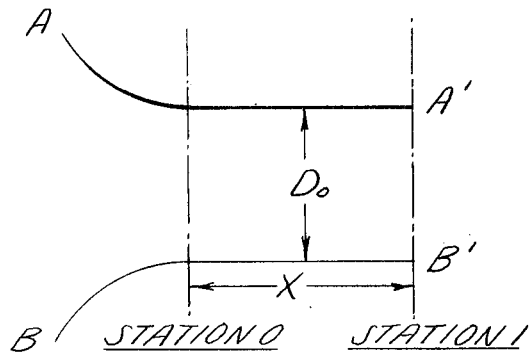
FIGURE 4A is a schematic view of the primary nozzle section as shown in FIGURE 1.
Figure 4B:
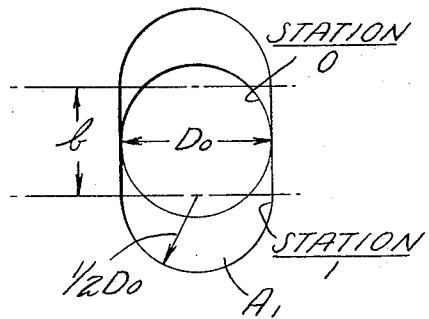
FIGURE 4B is a schematic end view of the primary nozzle section as it enters the primary nozzle diffuser section.

The next step in establishing the internal geometry of the aerodynamic gas valve is to compute the dimension b in FIGURE 4B from the following equation:

(8) $$A_1 = \frac{\pi D_0^2}{4} + b D_0$$

The area of $A_1$ can be calculated from standard flow equations using $M_1$, and computing $A_0$ using $D_0$. At station 0 the section is circular (diameter $=D_0$) and at station 1 the section is oval-shaped, having parallel sides of length b spaced a distance $D_0$ apart with semi-circular ends.

Figure 4C:
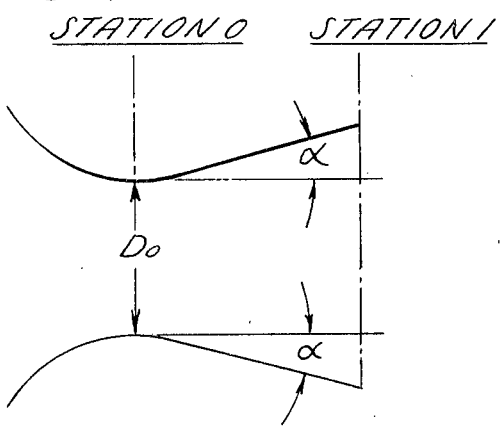
FIGURE 4C is a schematic view of the primary nozzle section taken from the top of FIGURE 1.

Next, establish lines AA' and BB' as defined by views 4A, 4B and 4C, the flared inlet is faired consistant with good engineering practice. Dimension x is determined by the selection of angle $\alpha$ (see FIG. 4C) which should be not more than 15° nor less than 10° (performance, weight and length are also considered). Next consider the maximum immersion depth y of control tab 7 (see FIG. 2). Experience has determined that y should equal $D_0/4$. It is noted that if a tab is used having a slanting edge, the length of the blade at its center is considered the length to use for y. From the downstream edge a of the tab 7 at this point, the line aa is constructed at an angle $\theta$ which is related to $M_1$, $Ps_1$, and $Ps_3$ or $Ps_4$ and was determined from Equations 5 and 6. A second line, bb, is drawn from point b, the downstream end of the primary nozzle section opposite the tab 7, also at the angle $\theta$, as indicated. The intersection of lines aa and bb at i forms the leading edge of the flow divider 8 that separates passage section 3 and passage section 4. Lines aa and bb beyond point i form the upper and lower surfaces, respectively, of the upstream portion of the flow divider 8. Lines can now be drawn from A″ and B″ parallel to lines aa and bb, as shown in FIGURE 5 to form the initial parts of the upper and lower walls, respectively, of passage sections 3 and 4. The thickness of the tab is determined on a basis of temperature, $PT_1$, and erosion characteristics of flow.

Passage height $h_1$ can b escaled from a properly sized layout. The cross-sectional areas of passage section 4 and exhaust sections 5 and 6 are equal to each other and are equal to the quantity $$PT_1/PT_2 \cdot \frac{\pi D_0^2}{4}$$

This can be demonstrated from ideal compressible gas flow equations since sonic flow conditions (Mach No.$=1.0$) exist at stations 0, 5 and 6 whenever $PT_1 \geqq 4Pa$. where $Pa$ is the ambient pressure. The length of the axial diffuser passage 3 and the lateral diffuser passage 4 is specified as three times $h_1$. This length is required to reduce the supersonic flow issuing from the primary nozzle section 1 to slightly below a sonic condition with a minimum energy loss due to friction. The passage section 4 has a cross section which is defined in FIGURE 6 and its area is calculated from the expression:

$$A_4 = \left(\frac{PT_1}{PT_5} \cdot \frac{\pi D_0^2}{4}\right) = \frac{\pi D_0^2}{8} +$$

$$w(h_1 - D_0/2) + (D_0/2)(w - D_0)$$

(9)

This equation permits calculation of the passage width, w, since all of the other quantities are known. The internal flow passages everywhere in the valve have corner radii $D_0/2$ to minimize secondary circulation flows that could cause additional pressure loss.

The downstream end radius 12 of the flow divider 8 is drawn tangent to the lower surface of the flow divider and swung to the primary nozzle center line. The aft surface 14 of the flow divider is also tangent to this radius thereby locating the aft surface of the flow divider. Edge E is located by first extending the upper surface of the flow divider a distance $3h$ from the intersection of lines $aa$ and $bb$ and $i$, and from this point further extending the upper edge in the axial direction, parallel to the center line of the primary nozzle, until an intersection is made with the aft surface of the flow divider. With edge E located it is possible to establish lines $ee$ and $dd$, as shown in FIGURE 5. Line $dd$ is spaced a distance $h_1$ from, and parallel to, the surface forming the rear part of the exhaust section 5. Line $ee$ is located a distance $h_1$ from, and parallel to, the rear surface of the divider 8.

The setback distance $s$ should be 0.5 $D_0$ to prevent attachment of the flow in the lateral diffuser passage section 4 when the tab 7 is withdrawn.

In a constructed device the wall angle $\theta$ as shown in FIGURE 2 was made 12.5°. The tab at its maximum inward position had a length equal to one-fourth of $D_0$. The setback was approximately .5 $D_0$. The passages 4 and 5 had a length equal to three times the height of passage 4.

I claim:

1. In an aerodynamic valve, a first conduit means defining a flow path having an inlet and outlet, a tab mounted adjacent the outlet of the first conduit means, said tab being movable into and out of the flow path from one side of said first conduit means, a second conduit means having an inlet and two outlets, said outlet of said first conduit means discharging into the inlet of said second conduit means, a setback portion being located at the inlet of the second conduit means opposite from the tab.

2. A valve as claimed in claim 1 wherein the first conduit means is formed as a nozzle having a circular throat section, said setback portion being set back a distance of approximately one-half the diameter of the circular throat section.

3. A valve as claimed in claim 1 wherein the first conduit means is formed as a nozzle having a circular throat section, said tab extending into the flow path a distance equal to at least one-quarter of the diameter of the circular throat section.

4. A valve as claimed in claim 1 wherein said second conduit means includes a flow divider, said flow divider having a forwardly positioned edge extending into the inlet of the second conduit means and positioned between the center line of the first conduit means and the setback portion.

5. A valve as claimed in claim 1 wherein the first conduit means is formed as a nozzle having a circular throat section, said setback portion being set back a distance of approximately one-half the diameter of the circular throat section, said tab being extendable into the flow path a distance equal to at least one-fourth of the diameter of the circular throat section.

6. A valve as claimed in claim 1 wherein the outlet of the first conduit means and the inlet of the second conduit means are of substantially the same size on the side where the tab is located.

7. A valve as claimed in claim 1 wherein the first conduit means is formed having a divergent section with the throat having a circular cross section, and the outlet being formed as an oval having parallel sides.

8. A valve as claimed in claim 7 where the distance between the parallel sides is equal to the diameter of the circular cross section.

9. A valve as claimed in claim 7 wherein the tab extends inwardly from one parallel side of said outlet and the setback portion extends outwardly from the other parallel side.

10. A valve as claimed in claim 9 wherein the inlet of said second conduit means adjacent said tab is formed having a contour to substantially match a contour of the outlet of said first conduit means.

11. A fluid operated device comprising, a primary nozzle section having an inlet and outlet, a pair of passages having inlets downstream of said nozzle section, a primary diffuser section interconnecting the outlet of said nozzle section to said passages, said pair of passages forming a flow divider therebetween, said flow divider having a forwardly positioned edge, a tab mounted adjacent the outlet of the nozzle section movable between a retracted and extended position, and a setback portion being located across the outlet of the primary nozzle from the tab.

12. A device as claimed in claim 11 wherein the nozzle section has a center line, said forwardly positioned edge of the divider being located between the center line of the nozzle section and the setback portion.

13. A fluid operated device as claimed in claim 11 wherein the length of the pair of passages is equal to three times the height of the passage located adjacent said setback portion.

14. A device as claimed in claim 11 wherein an operating flow passes through the primary nozzle section, said tab in its retracted position permitting free flow from the outlet of said primary nozzle section and in its extended position projecting into the flow at the outlet of the primary nozzle section.

15. A device as claimed in claim 11 wherein the outlet of the primary nozzle section and the portion of the primary diffuser section connected to the outlet of said nozzle section are of substantially the same size on the side where the tab is located.

16. A device as claimed in claim 11 wherein the flow divider is formed with one side extending from its edge at an angle formed by the continuation of a line drawn from the outlet of the primary nozzle adjacent the setback portion and with the other side extending from its edge at an angle formed by the continuation of a line drawn from the lower edge of the tab in its extended position.

17. A device as claimed in claim 16 wherein the angle formed by the line drawn from the outlet of the primary nozzle adjacent the setback portion is approximately 12.5° and the angle formed by the line drawn from the lower edge of the tab in its extended position is approximately 12.5°.

18. In a fluid operated device, a primary nozzle section, a primary diffuser section, two exit passage sections, said nozzle section exhausting into said diffuser section, said two passage sections extending from said diffuser section forming a flow divider therebetween having a forwardly directed edge, a tab mounted for insertion into or retraction out of the area between said primary nozzle section and said diffuser section, a setback portion formed in said diffuser section starting opposite the tab at the end of the primary nozzle section.

19. A device as claimed in claim 18 where said tab is algined with one passage section and the setback portion is aligned with the other passage section.

20. A device as claimed in claim 19 where said two passage sections have a length three times the height of the passage section aligned with the setback portion.

21. A fluid operated device comprising, a primary nozzle section having an inlet and outlet, said nozzle section having a longitudinal axis, a pair of passages having inlets downstream of said nozzle section, a primary diffuser section having an inlet connected to the outlet of said nozzle section and an outlet connected to the inlets of said passages, said pair of passages forming a flow divider therebetween, said flow divider having a forwardly positioned edge, a tab mounted adjacent to the outlet of the nozzle section and adjacent the inlet of said diffuser section movable between a retracted position in said device and an extended position across the outlet of said nozzle section and inlet of said diffuser section, a setback portion being located across the outlet of the primary nozzle from the tab, said forwardly positioned edge of the divider being located between the axis of the nozzle section extended and the side of the diffuser having the setback portion, the outlet of said nozzle section and inlet of said diffuser section being substatnially the same size on each side of said tab.

References Cited

UNITED STATES PATENTS

| | | |
|---|---|---|
| 2,676,602 | 4/1954 | Fox. |
| 2,694,898 | 11/1954 | Stauff. |
| 3,020,714 | 2/1962 | Eggers et al. __ 239—256.19 XR |
| 3,185,124 | 5/1965 | Spence _____ 239—265.19 XR |
| 1,517,598 | 12/1924 | Stevenson _____ 137—81.5 XR |
| 3,143,856 | 8/1964 | Hausmann ____ 137—81.5 XR |
| 3,266,512 | 8/1966 | Turick _____ 137—81.5 |
| 3,269,419 | 8/1966 | Dexter _____ 137—81.5 |
| 3,275,014 | 9/1966 | Plasko _____ 137—81.5 |
| 3,276,463 | 10/1966 | Bowles _____ 137—81.5 |
| 3,276,473 | 10/1966 | Lewis et al. ____ 137—81.5 XR |
| 3,311,306 | 3/1967 | Jones et al. ____ 137—81.5 XR |
| 3,330,483 | 7/1967 | Lewis _____ 137—81.5 XR |

SAMUEL SCOTT, Primary Examiner

U.S. Cl. X.R.

137—81.5; 239—265.29